May 21, 1940.  R. A. MILLER  2,201,406

HOT WATER HEATING ARRANGEMENT

Filed Oct. 24, 1938

Inventors
R. A. Miller
by
Attorney

Patented May 21, 1940

2,201,406

UNITED STATES PATENT OFFICE 2,201,406

HOT WATER HEATING ARRANGEMENT

Rudolph A. Miller, Milwaukee, Wis., assignor to Allis-Chalmers Manufacturing Company, Milwaukee, Wis., a corporation of Delaware Application October 24, 1938, Serial No. 236,622

13 Claims. (Cl. 237—19)

This invention relates generally to service water heating arrangements and more particularly to a simplified arrangement of elements for heating hot water for domestic and other uses in an efficient manner.

Therefore it is a primary object of this invention to provide a novel service water heating arrangement for a hot water type of heat generator or heating system.

Another object of this invention is to provide a novel combination of elements in which a hot water type of heat generator or heating system, an expansion tank for the generator or heating system and a water heating coil or an equivalent water heating device are so arranged as to provide a simplified arrangement which is highly efficient, cheap to manufacture and can be readily applied to existing installations.

A further object of this invention is to provide a novel expansion tank and/or a novel expansion tank arrangement embodying the invention.

Figure 1:
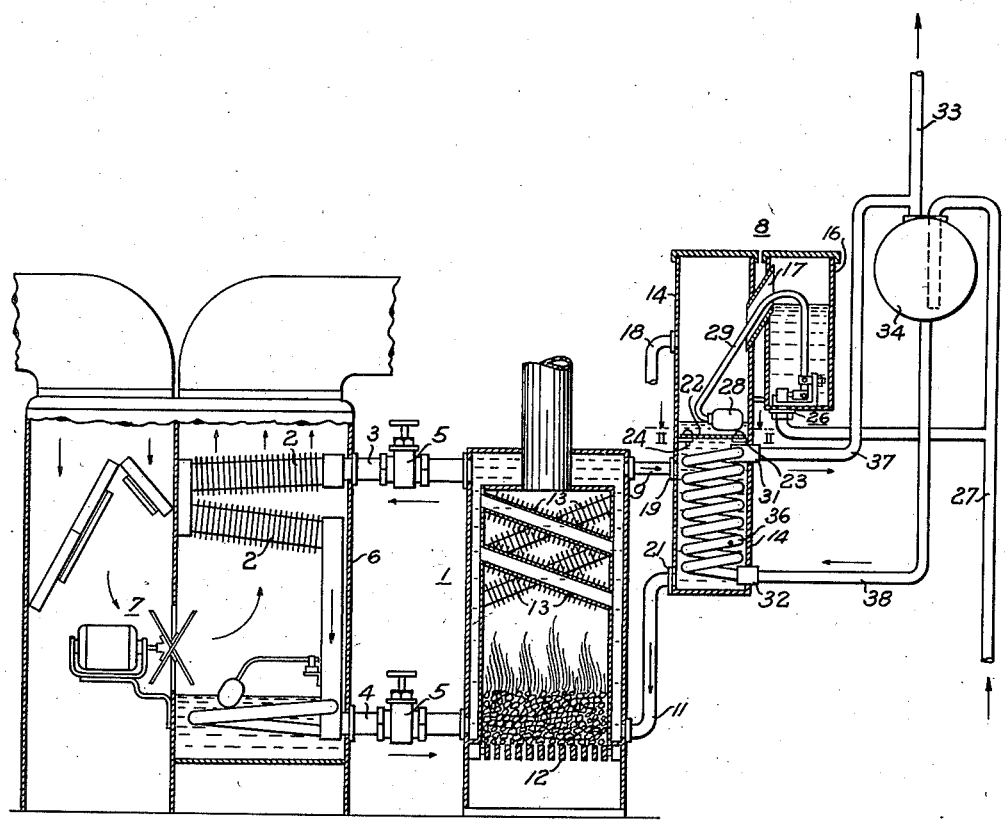
Figure 2:
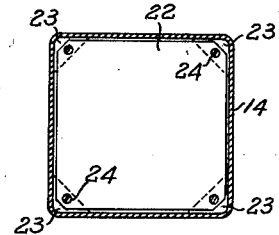

Accordingly the invention consists of the various features of construction, combination of elements, and arrangement of parts as is more particularly pointed out in the appended claims and in the detailed description in which:

Fig. 1 is a schematic illustration of an indirect hot air heating system embodying the invention and Fig. 2 is a sectional plan view of the expansion tank taken on the line II—II of Fig. 1.

The heating system, reference being had to Fig. 1, comprises a conventional hot water type of heat generator 1 which may be of any desired form, a radiator 2 which is connected in circulatory relation with the water jacketed casing of the generator 1 by means of pipes 3 and 4 each of which embodies a valve 5 for controlling the flow of water through the radiator 2, a cabinet 6 enclosing the radiator 2 and arranged to receive cold air from the space or spaces to be heated and to deliver heated air thereto, a motor driven fan unit 7 for accelerating the delivery of the heated air, and an expansion tank and water supplying arrangement 8 which is connected in circulatory relation with the heat generator 1 by means of pipes 9 and 11.

The generator 1 is of the solid fuel type and has the usual grate structure 12 and inclined water tubes 13 to facilitate circulation and heating of the water contained in the generator. The pipes 3 and 4 and the pipes 9 and 11 are connected to the upper and lower portions, respectively, of the generator water jacket to produce thermosyphon circulation of the water through the radiator 2 and through the expansion tank 8.

The expansion tank and water supplying arrangement 8, reference being also had to Fig. 2, comprises means defining a main receptacle 14 and an auxiliary receptacle 16, the top portions of which are in communication with one another by means of an inclined passage 17. A vent or overflow pipe 18 communicates with receptacle 14 at a point a slight distance below the passage 17 and a pair of pipe connections 19 and 21 which communicate with the receptacle 14 at vertically spaced points below the point of communication with the overflow pipe 18 are connected with pipes 9 and 11, respectively. A horizontally disposed baffled plate 22 is spaced a slight distance from the side walls of receptacle 14 and is supported by means of corner brackets 23 located above the connection 19 and below the point of communication with the pipe 18. One or more screws 24 may be used to secure the baffle plate in the position shown. The auxiliary receptacle 16 has a valve connection 26 with a source of water such as the ordinary city supply illustrated by pipe 27 and the valve is actuated by means of a float 28 which is disposed in the main receptacle 14 above the baffle plate 22 and is operatively connected with the valve controlling the admission of water to the auxiliary receptacle 16 by means of a lever 29 which extends through the passage 17. The arrangement is such that neglecting expansion the float maintains the water in the receptacle 14 at a substantially constant level above the baffle plate 22 and below the point of communication with the overflow pipe 18. Receptacle 14 is also provided with a pair of vertically spaced openings 31, 32 which are located below the baffle plate 22 and which provide for the connection of the necessary pipes to a heating coil or an equivalent device disposed within the receptacle 14. The receptacle 14 is so disposed relative to the generator and/or the heating system that the level of the water therein is maintained above the top of the generator 1 and of radiator 2 at all times. In actual practice the expansion tank and water supplying arrangement 8 is disposed between the generator 1 and the cabinet 6 with the pipes 9 and 11 connected with pipes 3 and 4, respectively.

The service water heating arrangement comprises a hot water distributing system illustrated by pipe 33, a storage tank 34 and a water heating coil or an equivalent device 36 which is disposed within the receptacle 14 below the baffle plate 22 and which is connected in circulatory relation with the distributing system 33 and with the storage tank 34 by means of pipes 37 and 38 which extend through the openings 31 and 32, respectively, in the side wall of receptacle 14. Suitable means are provided for preventing leakage from the receptacle 14 through the openings 31 and 32 and about the pipes 37 and 38. The storage tank is also connected with the city water supply pipe 27 in the usual manner. The storage tang 34 is arranged relative to the heating coil 36 so as to effect efficient thermosyphon circulation of water being heated but it should be understood that if means are provided to effect a positive circulation of the water to be heated through the coil 36 and storage tank 34 an arrangement operable to effect thermosyphon circulation of the water is not necessary. Moreover, it should also be obvious that if the heating capacity of the coil 36 is increased sufficiently the storage tank 34 may be disposed with and the pipe 38 connected to the water supply pipe 27 so that the system would then function as an instantaneous water heating arrangement.

It is thought that the operation of the herein described service water heating arrangement should be obvious to persons skilled in the art and that any further description in this respect would be confusing rather than helpful in understanding the invention. In this connection it should be noted that only those features which are essential for a complete understanding of the invention have been shown and described and that such features as the draft and fuel feeding means, the control mechanism therefor and a description of the heat exchanging, humidifying and filtering apparatus disposed within the cabinet 6 have been purposely omitted in order to simplify the disclosure. However, in the event more complete information with respect to non-essential features is desired, attention is directed to the U. S. Patent to Montrose K. Drewry 2,129,202, September 6, 1938, Air conditioning system.

The disclosed arrangement functions in a highly efficient manner in that it eliminates the use of a separate service water heating tank which materially increases the efficiency due to the fact that there is less apparatus containing heated water and therefore less wasteful heat dissipation. In addition, this arrangement decreases the water capacity of the heat generator and/or heating system and therefore renders the heat generator and heating system more readily responsive to heat demands. Furthermore, the novel arrangement presents a greatly simplified structure which is readily installed even in existing systems, cheap to manufacture and can be readily serviced when necessary with a minimum of trouble and expense.

The disclosure illustrates a particular application of the invention and it should therefore be understood that it is not desired to limit the invention to the exact details of construction and operation herein shown and described for various modifications within the scope of the claims may occur to persons skilled in the art.

It is claimed and desired to secure by Letters Patent:

1. In combination, a hot water type of heat generator, one or more radiators operatively associated with a space to be heated and connected in circulatory relation with said generator to form a closed system, an expansion tank extending above said generator and operatively connected in circulatory relation with said system and with a source of water and having means for maintaining the water in said tank above the top of the generator and at a substantially constant level, a baffle plate operatively positioned within said tank slightly below the normal level of the water therein to direct rising steam or air bubbles into proximity to the side wall of the tank prior to their reaching the surface of the water contained therein, a system for distributing heated water, and a closed hot water heating device disposed within said tank below said baffle plate and operatively in circulatory relation with said distributing system.

2. A water heating apparatus comprising a closed tank having a connection in the top portion thereof placing the interior of the tank in communication with the atmosphere, means for admitting water to said tank and operable to maintain the water within said tank at a substantially constant level below said connection, a baffle plate operatively positioned below the normal level of the water in said tank to direct rising bubbles of steam or air into proximity to the side wall of the tank prior to their reaching the surface of the water, connections for placing the interior of the tank in circulatory relation with a hot water heating system, a closed heat exchanging device disposed within said tank below said baffle plate, and connections for placing said device in circulatory relation with a system for distributing the water heated in said device.

3. In combination with a hot water heating system having an expansion tank operatively connected with said system, means placing the interior of said tank in communication with the atmosphere, and means operable to admit make-up water to said system through said tank and to maintain the water in said tank at a substantially constant level below said first mentioned means, baffle means operatively disposed within said tank to direct rising steam or air bubbles into proximity to the side wall of the tank prior to their reaching the surface of the water therein.

4. In combination with a hot water heating system having an expansion tank operatively connected with said system, means placing the interior of said tank in communication with the atmosphere, and means including a float disposed in said tank operable to admit water to said system through said tank and to maintain the water in said tank at a substantially constant level below said first mentioned means, baffle means operatively disposed within said tank immediately beneath the operative position of said float to direct rising steam or air bubbles into proximity to the side wall of the tank prior to their reaching the surface of the water therein.

5. In combination with a hot water heating system having an expansion tank operatively connected with said system and including an overflow connection, means operable to admit make-up water to said system through said tank and to maintain the water in said tank at a substantially constant level comprising an auxiliary receptacle disposed in non-heat conducting relation with respect to said tank, a connection placing the upper portion of said receptacle in communication with the upper portion of said tank at a point above said overflow connection, a valved connection for admitting make-up water to said receptacle, a device operatively associated within said tank below said overflow connection so as to be responsive to variations in the quantity of liquid contained in the said tank, and means operatively connecting said device and valve.

6. In combination with a hot water heating system having an expansion tank operatively connected with said system and including an overflow connection, means operable to admit make-up water to said system through said tank and to maintain the water in said tank at a substantially constant level comprising an auxiliary receptacle disposed in non-heat conducting relation with respect to said tank, a connection placing the upper portion of said receptacle in communication with the upper portion of said tank at a point above said overflow connection, a valved connection for admitting make-up water to said receptacle, a float disposed in said tank below the said overflow connection, and means extending through said communicating connection and operatively connecting said float and valve.

7. In combination with a hot water heating system having an expansion tank operatively connected with said system and including an overflow connection, means operable to admit make-up water to said system through said tank and to maintain the water in said tank at a substantially constant level comprising an auxiliary receptacle disposed in non-heat conducting relation with respect to said tank, a connection placing the upper portion of said receptacle in communication with the upper portion of said tank at a point above said overflow connection, a valved connection for admitting make-up water to said receptacle, a float disposed in said tank, means operatively connecting said float and valve, and baffle means operatively disposed in said tank immediately beneath the operative position of said float to direct rising steam or air bubbles into proximity to the side wall of the tank prior to their reaching the surface of the water therein.

8. A water heating apparatus comprising a tank having an overflow connection and means for operatively connecting said tank in a hot water heating system to function as an expansion tank, means for admitting make-up water to said tank and for maintaining the water in said tank at a substantially constant level comprising an auxiliary receptacle spaced from said tank, means placing the upper portion of said receptacle in communication with the upper portion of said tank at a point above said overflow connection, a valve for admitting make-up water to said receptacle, a device operatively associated within said tank below said overflow connection and operatively connected with said valve so as to open and close the said valve in response to variations in the quantity of liquid contained in the said tank, a closed heat exchanging device disposed within said tank below said first mentioned device, and connections for placing said heat exchanging device in circulatory relation with a system for distributing the water heated in said heat exchanging device.

9. A water heating apparatus comprising a tank having an overflow connection and means for operatively connecting said tank in a hot water heating system to function as an expansion tank, means for admitting make-up water to said tank and for maintaining the water in said tank at a substantially constant level comprising an auxiliary receptacle spaced from said tank, means placing the upper portion of said receptacle in communication with the upper portion of said tank at a point above said overflow connection, a valve for admitting make-up water to said receptacle, and a float disposed in said tank below said overflow connection and operatively connected with said valve, a closed heat exchanging device disposed within said tank below said float, connections for placing said device in circulatory relation with a system for distributing the water heated in said device, and baffle means operatively disposed between said device and float and in close proximity to the operative position of the latter to direct rising steam or air bubbles into proximity to the side wall of the tank prior to their reaching the surface of the water therein.

10. An expansion tank and make-up water apparatus comprising a closed receptacle having an overflow connection, an auxiliary receptacle spaced from said closed receptacle, means placing the upper portions of said receptacles in communication at a point above said overflow connection, means including a float in said closed receptacle and a valved connection to said auxiliary receptacle for admitting make-up water to said receptacles and for maintaining the water in said closed receptacle at a predetermined level below said overflow connection and said communicating means, a baffle means operatively disposed in said closed receptacle immediately beneath the operative position of said float to direct rising steam or air bubbles into proximity to the side wall of the closed receptacle prior to their reaching the surface of the water therein, and means for operatively connecting said closed receptacle with a hot water boiler or heating system.

11. An expansion tank and make-up water apparatus comprising a closed receptacle having an overflow connection, means for admitting make-up water to said receptacle and for maintaining the water in said receptacle at a predetermined level below said overflow connection, a baffle means operatively disposed within said tank a slight distance below the said predetermined water level to direct rising steam or air bubbles into proximity to the side wall of the receptacle prior to their reaching the surface of the water, and means for operatively connecting said closed receptacle with a hot water boiler or heating system.

12. In combination, a hot water space heating system, an expansion tank having its upper portion provided with a vent opening which may serve as an overflow and having its lower portion operatively connected with said system, means normally operative to admit system make-up water into said tank and to maintain the water in said tank at a substantially constant predetermined level below the said opening, and a baffle means disposed within said tank a slight distance below the said predetermined water level and constructed and arranged to provide a restricted passage between the upper and lower portions of said tank through which rising steam and air bubbles are directed immediately prior to their reaching the surface of the water.

13. In combination, a hot water space heating system, a tank having a vent opening in the upper portion thereof which may serve as an overflow, means operatively connecting said tank and system so that during operation of the system said tank functions as an expansion tank and so that there is a continuous circulation of water from said system, through said tank and back to said system, means operative to admit make-up water to said system and to maintain the water in said tank at a substantially constant predetermined level above the water circulating connections to said tank, a baffle means disposed in said tank a slight distance below the said predetermined water level and above the said circulatory connections and constructed and arranged to provide a restricted passage means between the upper and lower portions of said tank and to confine the flow of the circulating water through said tank to the portion of the tank between the said baffle means and the bottom of the tank, and a closed water heating device disposed within said tank below the said baffle means and having connections for permitting water which is to be heated to flow through said device.

RUDOLPH A. MILLER.

CERTIFICATE OF CORRECTION.

Patent No. 2,201,406. May 21, 1940.

RUDOLPH A. MILLER.

It is hereby certified that error appears in the printed specification of the above numbered patent requiring correction as follows: Page 2, second column, line 11, claim 1, after "operatively" insert the word --connected--; and that the said Letters Patent should be read with this correction therein that the same may conform to the record of the case in the Patent Office.

Signed and sealed this 2nd day of July, A. D. 1940.

(Seal)

Henry Van Arsdale,
Acting Commissioner of Patents.